UNITED STATES PATENT OFFICE.

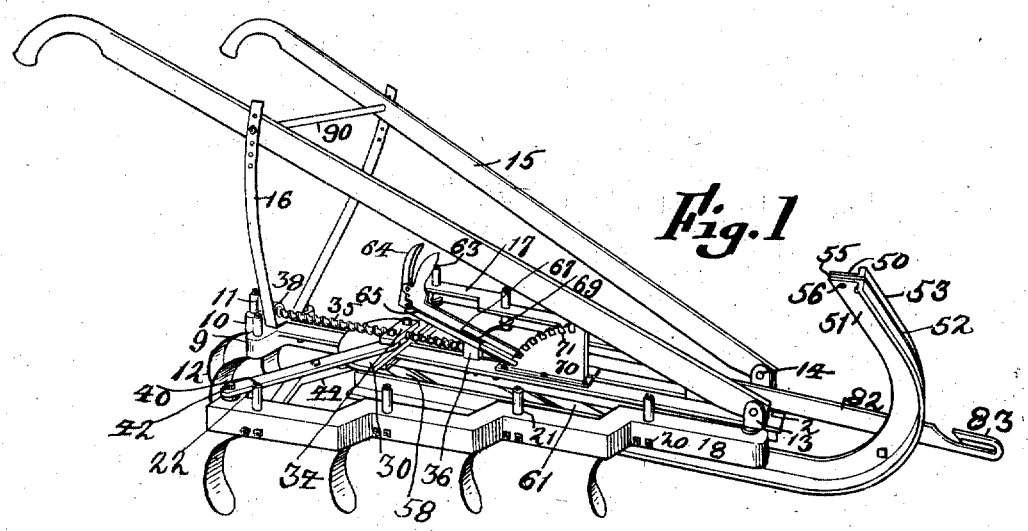

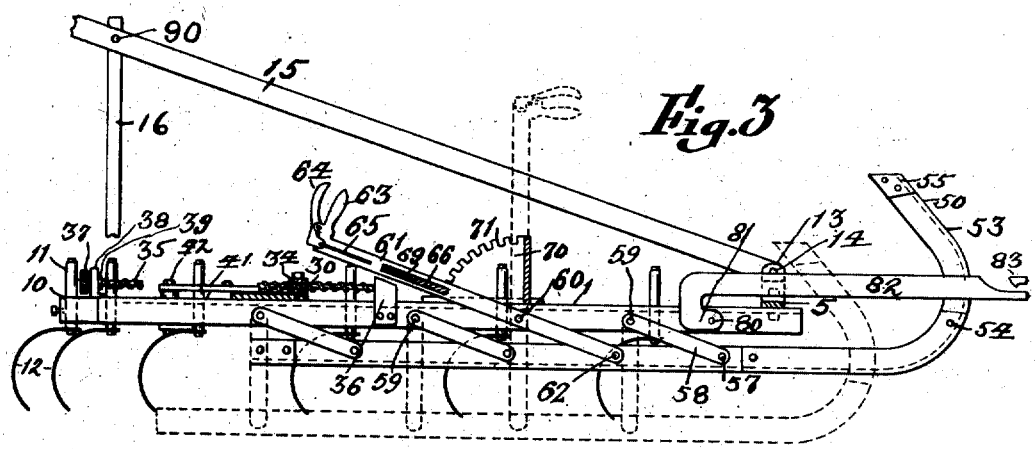
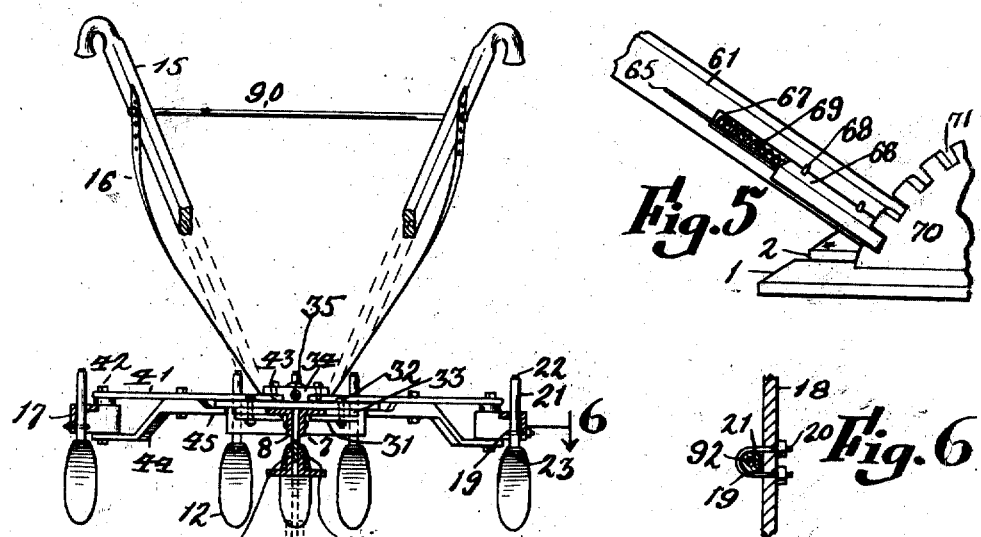

FREDERICK H. MYERS, OF BARBERTON, OHIO.

CULTIVATOR.

1,275,588.  Specification of Letters Patent.  Patented Aug. 13, 1918.

Application filed April 24, 1917. Serial No. 164,149.

*To all whom it may concern:*

Be it known that I, FREDERICK H. MYERS, a citizen of the United States, residing at Barberton, in the county of Summit and State of Ohio, have invented new and useful Improvements in Cultivators, of which the following is a specification.

This invention relates to cultivators for tilling the soil.

The object of the invention is to provide a cultivator adapted to be either manually propelled or dragged by power of any kind and equipped with teeth for cultivating purposes and also further provided with a runner which when moved to its operative position constitutes a supporting means for holding the teeth out of contact wth the ground when desired as for instance, when the device is being moved from place to place, and also arranged when moved to an appropriate position to serve as a guide or gage for controlling the depth of insert on the teeth in the soil.

The invention also contemplates the provision of a pair of arms capable of being laterally spread apart, said arms equipped with cultivator teeth whereby the width of the zone or area engaged by the cultivator or device may be varied at will.

With the foregoing and other objects in view, the invention consists in the novel construction, combination and arrangement of parts constituting the invention to be hereinafter specifically described and illustrated in the accompanying drawings which form a part hereof wherein is shown the preferred embodiment of the invention, but it is to be understood that changes, variations and modifications can be resorted to which come within the scope of the matter hereinafter claimed.

In the drawings in which similar reference numerals indicate like parts in the different figures, Figure 1 is a perspective view of a cultivator embodying the present invention.

Fig. 2 is a plan view of the same.

Fig. 3 is a vertical central sectional view taken approximately on line 3 of Fig. 2.

Fig. 4 is a vertical transverse sectional view taken approximately on line 4 of Fig. 2.

Fig. 5 is a detail of mechanism employed for raising and lowering the device, and Fig. 6 is a detail view taken on line 6 of Fig. 4 showing the means for holding the supports for the cultivator teeth.

Referring specifically to the drawings the device embodies a main beam 1 provided with a central longitudinal slot 2 which divides the front end of the beam into two parallel spaced members 3 and 4, the front ends of which are secured together and held in spaced relation by means of a cross bar 5 secured to the members 3 and 4 by bolts 6. The members 3 and 4 are respectively provided with downwardly-extending parallel flanges 7 and 8 (see Fig. 4). The rear portion of the beam 1 is provided with an integral T-head embodying lateral projections 9 and a central rearwardly-projecting lug 10. The extensions 9 and the lug 10 are vertically apertured to constitute bearings for the shanks 11 of cultivator teeth 12. The cross bar 5, at the forward end of the beam 1, is provided at each end with a pair of ears 13 with the ears of each pair in spaced relation and with all ears arranged at an inclination to the beam 1. Pivotally mounted in each pair of ears by means of members 14 is a handle 15 the rear portions of which are connected by a cross bar or rod 90 which extends through suitable apertures in the handles and coöperates with a U-shaped brace 16 the ends of which are provided with a series of apertures to receive the projecting ends of the bar 90 for holding the handles in a desired position. The central portion of the U-shaped brace is connected to the upper face of the T-shaped head at the rear end of the beam 1. Pivotally secured to the under face of the cross bar 5 at the forward end of the beam 1, are a pair of rocking arms 17 and 18 constructed identically alike but reversely positioned. Each arm is fashioned in a series of steps, each step extending outwardly from the beam 1 a short distance farther than the next forward and adjacent step. Secured to the arms 17 and 18 are a series of cultivator teeth each embodying an upright shank which projects vertically through a suitable aperture in the upper wall of the arm to which it is attached. Each of the arms 17 and 18 is L-shaped in cross section and embodies an upper wall and a vertical or lateral wall and these shanks are clamped to the lateral wall while projecting through the upper wall by means of U bolts 20 of ordinary construction with threaded ends and provided with nuts for the clamping operation. The shanks of all the teeth on the device are constructed substantially alike and each consists of a tubular sleeve 21 through which extends a bolt 92 each provided with a head 22 (see Fig. 4) and each having the opposite end threaded to receive a nut 23, which is adapted to clamp one end of the cultivator tooth and hold it against the lower end of the sleeve 21, and by this provision when the sleeve 21 is clamped by a U-shaped bolt 20 the bolt 92 may be rotated horizontally to secure a desired position for the cultivator tooth carried thereby and also the sleeve may be raised or lowered without disturbing the connection between the bolt 92, the sleeve 19 and the cultivator tooth. In the instance of the shanks for the cultivator teeth 12 where the shanks pass through the openings in the head 9 of the beam 1, the set screws 11 engage the sides of the sleeves 21 and do not interfere with the manipulation of the cultivator teeth.

Mounted on the upper face of the rear portion of the beam 1 is a plate 30 the front face of which is at right angles to the longitudinal axis of the beam 1 and with the rear face or edge of the plate arcuately fashioned. This plate 30 is wider than the upper face of the beam 1 and overhangs the same. The plate 30 is adapted to slide longitudinally of the upper face of the beam 1 and is held from lateral movement thereon by means of two guiding strips 31 secured to the under face of the member 30 and positioned on opposite sides thereof and held in position by holding means 32. These guiding strips 31 are held in spaced relation with respect to the under face of the plate 30 by spacing blocks 33 so that the guiding strips 31 form in connection with the plate 30 and spacing blocks 33 a pair of channels which receive the outwardly-extending flanged upper walls of the beam 1 and form channels for this purpose to permit the longitudinal sliding of the plate without lateral movement thereof. Mounted on the upper face of the front portion of the plate 30 is a T-headed block 34 provided with overhanging lateral ends and this block is also provided with a central threaded aperture in which is received a threaded shaft 35 the front end of which is adapted to engage an abutment 36 positioned in the slot 2 of the beam 1 and held there by any suitable holding means such as rivets. The opposite end of the shaft is provided with a manipulating head 37 and this end of the shaft 35 is supported in a bearing 38 mounted on the upper face of the rear end of the beam 1. The shaft 35 bears adjacent to the bearing 38 a collar 39 to prevent the shaft when manipulated from moving to the left in Fig. 2 and the abutment 36 prevents movement in the opposite direction. The lateral ends of the block 34 are separated from the upper face of the plate 30 to provide a space through which extend pivots 95 for links 40 and 41 for laterally oscillating the teeth-bearing arms 17 and 18. Connecting the member 34 with the arm 18 is a link 40 and a similar link 41 connects the member 34 with the free end of the arm 17. The free ends of the arms 17 and 18 are enlarged and preferably are formed solid and in these end portions are pivotal pins 42 each projecting above and below the upper and lower faces of the ends and the links 40 and 41 are connected to the upper projecting portions of these pins respectively.

The links 40 and 41 are identical and hence a description of one is believed to be sufficient for the understanding of both. Secured to the under face of each link is a combined guiding and supporting member 44 the central portion of which is fastened to the under face of one of the links and with the outer portion of each brace extending under the respective free end of one of the arms 17 or 18 and operatively connected with the downwardly-projecting end of the pivot 42. The inner ends 45 of the braces 44 are fashioned to engage under the plate 30 and to serve as means for preventing any upward movement of the outer ends of the arms 17 and 18 and by their engagement with the plate 30 they permit lateral and horizontal but not vertical movement of the links 40 and 41 to which they are attached. The inner ends 45 of the member 44 in connection with the links 40 and 41 form jaws which freely receive the plate 30 and hold the arms 17 and 18 from vertical movement while permitting the free swinging of the outer ends of the links in shifting or oscillating the arms 17 and 18. From the foregoing it will be seen that when the screw 35 is rotated the plate 30 is moved longitudinally of the beam 1 thereby swinging the outer ends of the links 40 and 41 inwardly or outwardly, dependent upon the direction of movement of the plate 30, and as the links are connected with the outer ends of the arms 17 and 18 the latter are oscillated to bring them to a desired position dependent upon the position which it is desired that the cultivator teeth carried by these arms shall assume.

The runner or means by which the cultivator may be transported from place to place without causing the teeth to engage the ground and also which serves as a gage for regulating the depth of the furrows cut by the teeth and which comprises an important feature of the present invention consists in a pair of bars 50 and 51 identically alike in all respects and each L-shaped in cross section to provide two flanges arranged at right angles with each other and with one flange of each member horizontal to the general frame of the machine and with the other flange thereof oppositely disposed to a flange of the other member and arranged in spaced relation therewith to provide a central groove or channel 52 between them. This runner is so fashioned that the front is upwardly bent in arcuate formation to provide a head or front 53 and the two members of the runner are secured together by means of bolts 54. Between the two members 50 and 51 are spacing blocks 55 through which pass bolts 56. Extending between the opposing upright or vertical flanges of the members 50 and 51 are a plurality of pins 57 to which are attached links 58 the upper ends of which are respectively connected with pins 59 extending between the depending flanged portions of the beam 1. These links 58 will at all times be parallel with respect to each other and they serve to connect the beam and runner in the same manner that the members of a parallel ruler are attached to each other. Extending between the flanged members of the beam 1 is a pin 60 on which is pivotally mounted an operating lever 61 the lower end of which is connected with a pin 62 extending between the upright flanges of the members 50 and 51. The upper end of the lever 61 bears a handle 63 to which is pivoted a second lever or controller 64 to one end of which is connected a wire 65 which in turn is connected with a lock 66 suitably mounted for longitudinal shifting in a slot 67 in the lever 61 and held against lateral movement by guiding pins 68. The lock 66 is normally forced inwardly toward the pin 60 by means of a coiled spring 69. Mounted on opposite sides of the slot 2 on the beam 1 are quadrants 70 provided on their arcuate faces with teeth or notches 71 with the notches of the two quadrants in transverse alinement with each other. The lock 66 is of sufficient width to engage the alined notches in both quadrants simultaneously.

Extending across the slot 2 in the beam 1 is a pivot pin 80 to which is connected the inner hook shaped end 81 of an arm 82 which extends outwardly through the slot in the curved front portions of the members 50 and 51 and it is provided outside of said portions with means 83 to which suitable draft mechanism can be attached for dragging the cultivator.

In operation, when it is desired to transport the cultivator to a field for use the operating lever 61 is raised to its upper position as shown in dotted lines in Fig. 3 which causes the runner to be forced downwardly so that the lower working face thereof will engage the ground and raise the teeth of the cultivator from contact therewith. The cultivator is then dragged or pushed to the field of operation and the operating lever 61 is then depressed sufficiently to permit the teeth to engage the ground to any preferred or desired depth. The operator then determines from an inspection of the ground to be cultivated, the relative needed positions of the two arms 17 and 18 and by manipulating the screw 35 he so adjusts the arms that the teeth carried thereby will perform the cultivating operation properly and effectually. Of course, the relative positions of the two arms 17 and 18 may be changed at any time. If it is desired for any reason to change the vertical position of the various teeth with respect to the frame of the cultivator the U-shaped bolts 19 are released and the teeth adjusted and the U-shaped bolts retightened holding the teeth in the proper position and the same operation is employed with respect to the teeth carried by the rear end or head of the beam 1, only in this instance the set screws 11 are released sufficiently to permit the adjustment of the teeth. It will be obvious, of course, that the teeth can be rotated on their axes as well as raised vertically, so as to cause them to engage the ground at an inclination, if desired.

I claim:

1. A cultivator comprising a slotted beam, an arm pivotally connected with each side of the front end of said beam, depending teeth carried by each arm, a member longitudinally slidable on said beam, means connecting the member with the rear ends of said arms, said member arranged when shifted to change the positions of said arms laterally and means to shift said member.

2. A cultivator comprising a slotted beam, cultivator teeth carried thereby, a gage runner below said beam, a plurality of links connecting said beam and runner, said links arranged when moved to their vertical position to raise said beam and teeth to their inoperative position, a lever pivotal on said beam and arranged in parallelism with said links and engaging said runner and adapted when shifted to change the vertical position of said runner, and means for holding said lever in a predetermined position and thereby control the relative position of the under face of said runner.

3. A cultivator comprising a slotted beam, an arm pivotally connected with each side of the front end of said beam, cultivator teeth carried by each arm, a slide embodying a laterally-projecting plate mounted on said beam, pivots on said plate, links connecting said pivots with the free ends of said arms, an interiorly-threaded nut mounted on said plate, a bearing mounted at the rear end of said beam, a threaded shaft mounted in said bearing and extending through said nut and arranged when rotated to shift the position of said slide and thereby oscillate said arms, a member secured to the under face of each link, the outer ends of which are provided with means to constitute a bearing for pivotal connection with the end of said tooth bearing arms the inner ends of said members having engagement with said plate for permitting horizontal movement of said links for preventing vertical movement of said links and arms.

In testimony whereof I have hereunto set my hand.

FREDERICK H. MYERS.